G. W. KELLOGG.
FLUID PUMP.
APPLICATION FILED APR. 2, 1918.
Reissued July 2, 1918.
14,490.
2 SHEETS—SHEET 1.
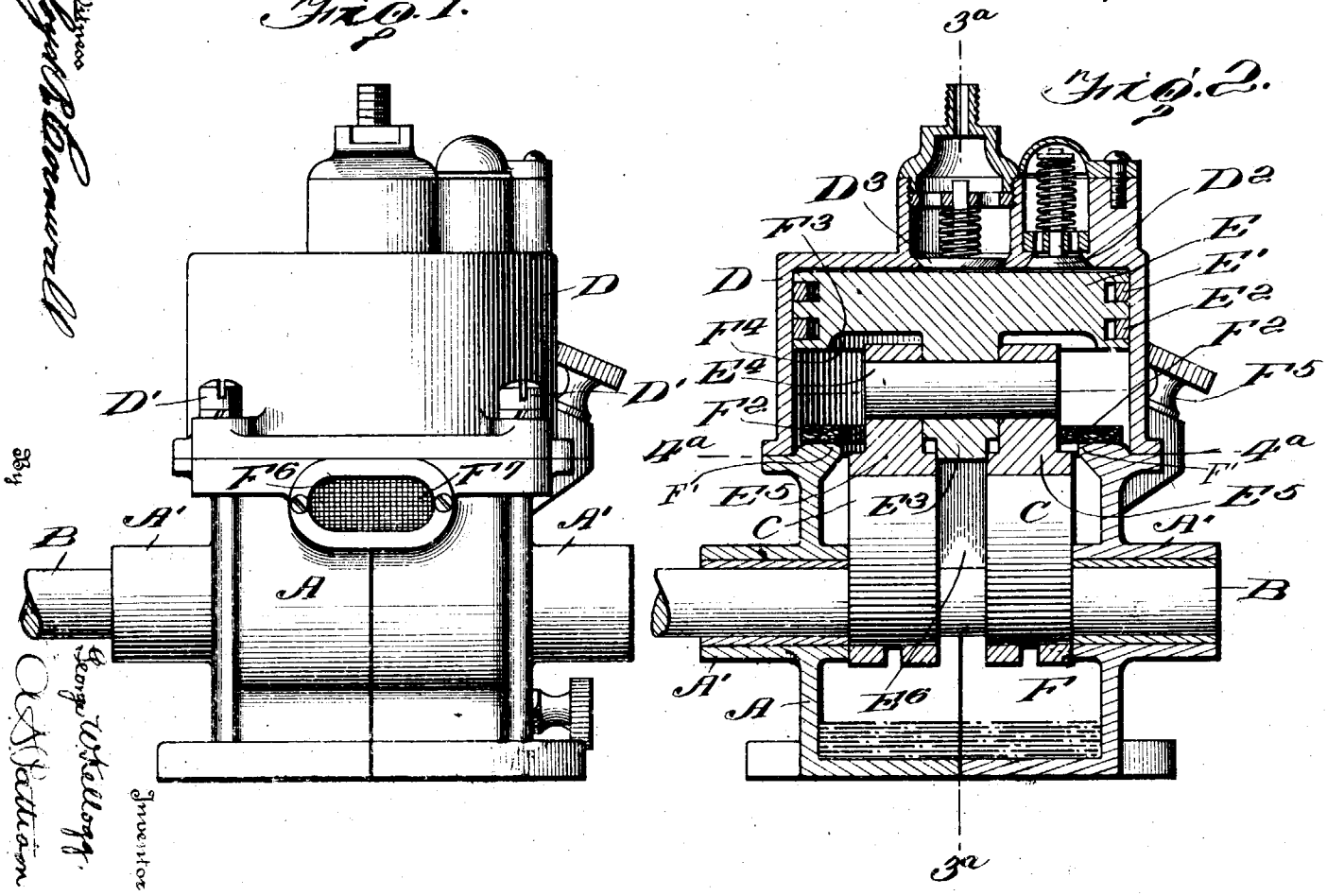
Witness
Lloyd R. Cornwall
Inventor
George W. Kellogg.
By
A. S. Pattison
Attorney

G. W. KELLOGG.

FLUID PUMP.

APPLICATION FILED APR. 2, 1918.

Reissued July 2, 1918.

14,490.

2 SHEETS—SHEET 2.

Inventor

George W. Kellogg,

By A. S. Pattison,

Attorney

Witness

Floyd R. Cornwell.

UNITED STATES PATENT OFFICE.

GEORGE W. KELLOGG, OF ROCHESTER, NEW YORK, ASSIGNOR TO KELLOGG MANUFACTURING COMPANY, OF ROCHESTER, NEW YORK, A CORPORATION OF NEW YORK.

FLUID-PUMP.

14,490. Specification of Reissued Letters Patent. Reissued July 2, 1918.

Original No. 1,187,531, dated June 20, 1916, Serial No. 862,843, filed September 21, 1914. Application for reissue filed April 2, 1918. Serial No. 226,333.

*To all whom it may concern:*

Be it known that I, GEORGE W. KELLOGG, of Rochester, in the county of Monroe and State of New York, have invented certain new and useful Improvements in Fluid-Pumps; and I do hereby declare the following to be a full, clear, and exact description of the same, reference being had to the accompanying drawings, forming a part of this specification, and to the reference characters marked thereon.

The present invention relates to fluid pumps, with more particular reference to the type of pump that is employed for obtaining air and other light fluids under pressure, and it has for its object to provide a novel construction and arrangement of the several parts, affording a machine that is characterized by great compactness and lightness of weight, while at the same time resulting in extreme efficiency in operation.

A further object of the invention consists in so combining the several parts as to afford a balanced structure operating under a minimum amount of friction, and which can be successfully applied to small units.

Still another purpose of the invention is found in the provision of lubricating means that prevents the admission of any lubricant into the pressure chamber or into the fluid passing through the pump.

Another object that the invention contemplates is the provision of novel features affecting the connection between the drive shaft and the piston, whereby greater capacity and strength is obtained.

To these and other ends the invention consists in certain improvements and combinations of parts, all as will be hereinafter more fully described, the novel features being pointed out in the claims at the end of the specification.

In the drawings:

Figure 1 is a side elevation of a pump constructed in accordance with the invention.

Fig. 2 is a longitudinal vertical sectional view.

Similar reference numerals throughout the several views indicate the same parts.

Figure 4:
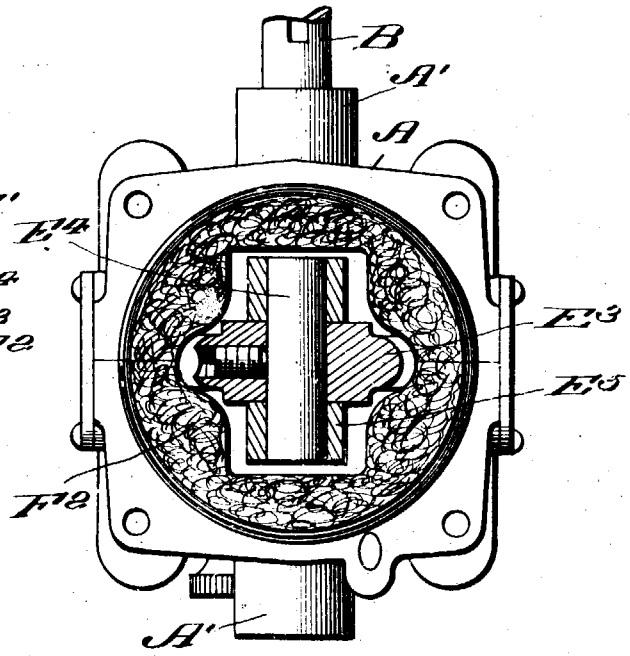
Fig. 4 is a horizontal sectional view on the line $4^a$—$4^a$ of Fig. 2.
Figure 3:
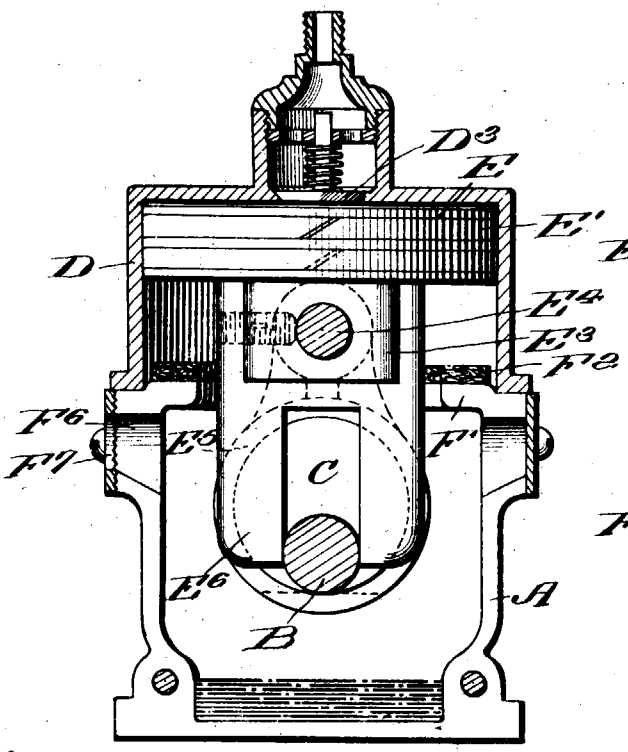
Fig. 3 is a transverse vertical sectional view on the line $3^a$—$3^a$ of Fig. 2.

The invention is susceptible of many different applications, and has been designed primarily for the purpose of providing a small, light, compact structure possessing a high degree of efficiency, such as is employed as an adjunct to automobile construction, to afford a means for carrying a supply of air under pressure at all times without occupying much space or adding substantial weight to the machine.

In the present embodiment, which is a practical illustration of one application of the invention, A designates a base provided with bearings A′ within which is journaled the drive shaft B. The latter has fixed thereon a pair of eccentrics C which are arranged in spaced relation to each other, and constitute a part of the connecting means between the drive shaft and the piston which is to be hereinafter described.

Detachably arranged on the base A is a cylinder D, that is comparatively short in order to reduce the weight and size of the machine as much as possible, and the cylinder may be secured on the base in any desirable manner as by means of screws D′ which engage alined openings in the cylinder and base. The cylinder is provided with intake and outlet valves $D^2$ and $D^a$ controlling the passage leading to and from the cylinder and these are of the usual construction such as employed in this type of machinery.

Arranged for reciprocatory movement within the cylinder D is a piston E that is comparatively short and wide corresponding to the proportion of the cylinder so that while only a short stroke is imparted to the piston, the reduction is more than offset by the increased cross sectional area of the piston and cylinder. The piston E is provided with flexible packing rings E′ seated in grooves $E^2$, and carries a downwardly projecting extension $E^3$ which is connected by a wrist pin $E^4$ with the eccentric straps $E^5$ surrounding the aforesaid eccentrics C. It will be noted that the connecting devices between the piston and drive shaft are disposed in spaced relation to each other on opposite sides of the axial line of the piston thereby balancing the movement of the latter and increasing the power of the machine while at the same time affording an arrangement that permits of successful guiding the movement of the piston and retaining it at all times in proper relation at right angles to the axis of the cylinder. To this end I form on the extension $E^3$, at the lower part thereof, a yoke portion $E^6$ which straddles the drive shaft B, the arms of the yoke portion being such a distance apart as to closely engage the drive shaft during the travel of the piston. This serves to hold the piston in proper alinement, so that its travel in the cylinder is subjected to the smallest possible amount of frictional resistance.

It is highly desirable in a pump of this character to afford lubrication for the parts without permitting any of the lubricating fluid from entering or mixing with the fluid under pressure, and this I have accomplished in a novel manner by means which I will now describe. F designates the oil chamber in the base A, and at the upper portion of the base is a baffle flange F′ preferably formed integral with the base and operating to cause the lubricating oil to be projected toward the center of the under surface of the piston rather than toward the wall of the cylinder as would be the case if the baffle were not provided. The baffle extends inward between the base A and the cylinder D, and is to intercept oil splash and thereby prevent excess lubrication, and to at the same time receive oil on its top to provide a limited but efficient lubrication between the cylinder and piston. The specific way here shown of receiving the oil on top of the baffle for lubricating purposes, is by using an absorbent pad $F^2$ partly covering the baffle flange F′, which latter, as here shown, is preferably though not necessarily made integral with the base A. The pad $F^2$ forming the top portion of the complete baffle receives some of the oil-splash, for lubricating the cylinder and piston. It is apparent that some oil will reach the cylinder wall by capillary travel from the outer edge of the baffle, and that the piston will receive a little oil when the pad $F^2$ is thick enough to be touched by the extreme downward movement of the piston. Any surplus oil will drop from the inner edge of the baffle down into the oil chamber. While I prefer the use of a pad to assist in the lubrication of the piston and cylinder, it will be apparent to those skilled in the art that the pad is not essential where the splash is sufficient to keep an oil supply on the top of the baffle flange to flow to the cylinder wall. The pad is a more certain way of keeping a uniform supply of oil for lubricating the cylinder and piston, and is therefore preferred. This action is facilitated by providing the piston on its under surface with deflecting means, which in the present instance consists of recessed portions $F^3$ terminating at a distance from the edge of the piston, affording curved shoulders $F^4$. These deflect the oil downwardly before it reaches the edge of the piston, causing it to fall initially onto the absorbent ring $F^2$. When the piston travels downwardly it contacts with the ring $F^2$, thus slightly lubricating the outer portion of the lower face of the piston and supplying the requisite amount of lubrication to the inner wall of the cylinder as the piston travels upwardly. This prevents an excess of oil from coming into engagement with the walls of the cylinder, so that none of the lubricant will be carried past the piston and injected into the fluid undergoing compression.

From the foregoing description and illustration, it will be understood by those skilled in the art, that the specific construction of baffle can be changed, and that no part of it need be integral as shown, and still perform its described two primary functions (1) of preventing excessive lubrication by oil splash, and (2) hold oil on its upper surface to provide a limited but efficient lubrication between the cylinder and piston. It will also be understood that although the baffle for accomplishing the described result is here shown as made up of two parts, viz., the flange F′ and ring $F^2$, the described functions of the parts would not be changed if made in one part, or plate extending into the communication between the base and cylinder. That is to say, it will be understood that my invention is present where a baffle extends inward at the bottom of the cylinder, and performs the two functions of (1) preventing excessive lubrication by oil splash, and (2) holding on its upper surface sufficient of the oil splash for limited but efficient lubrication between the cylinder and piston. From the illustrations it will, of course, be understood that a limited quantity of oil will reach the cylinder wall by its outward capillary attraction or travel on the top of the baffle to the cylinder wall for lubrication between the piston and cylinder, both with and without the pad $F^2$. That is to say, the baffle (without the pad $F^2$) will receive a limited oil-splash on its top, and that the oil will travel outward to the cylinder wall to provide lubrication, while the surplus will drop from its inner edge to the oil chamber below, and that in this event the baffle will perform its primary functions of intercepting the oil splash to the cylinder wall to prevent excess lubrication, and of receiving and holding a limited quantity of oil on its top which will serve to lubricate between the cylinder wall and piston.

The oil chamber is filled through an opening controlled by a plug $F^5$, and $F^6$ designates an air opening for the base, covered by the screen $F^7$.

The invention affords an extremely simple arrangement that can be manufactured at low cost, and presents great advantages in efficiency of operation. The structure is compact and can be readily handled, requiring little space and adding but a small weight to the machine to which it is applied.

I claim as my invention:

1. In a pump, the combination with a base having an oil chamber located therein, of a cylinder arranged on the base, a piston reciprocating in the cylinder, and a baffle located at the bottom of the cylinder to prevent oil splash from the oil chamber to the cylinder walls but adapted to receive oil on its upper surface, whereby efficient lubrication is provided and excessive lubrication prevented.

2. In a pump, the combination with a base having an oil chamber located therein, of a cylinder arranged on the base, a piston reciprocating within the cylinder, and a baffle located to intercept oil splash from the oil chamber to the cylinder wall to prevent excess lubrication and adapted to receive oil on its upper surface to provide a limited but efficient lubrication between the piston and cylinder.

3. In a pump, the combination with a base having an oil chamber therein at its bottom, a cylinder located on the base and in open communication therewith, a reciprocating piston in the cylinder, and a baffle located between the base and the cylinder, said baffle extending into said open communication between the base and cylinder thereby intercepting oil splash from the oil chamber to the cylinder wall to prevent excess lubrication of the cylinder wall and piston, but adapted to hold oil on its upper surface to furnish a limited but efficient lubrication between the cylinder and piston.

4. In a pump, the combination with a base having an oil chamber in its bottom, of a cylinder located on the base and in open communication therewith, a reciprocating piston in the cylinder, and a baffle located between the cylinder and the base and effectively closing said open communication between the cylinder and base, said baffle intercepting oil splash from the oil chamber to the cylinder wall to prevent excessive lubrication, but adapted to receive and hold oil on its upper surface thereby providing a limited but efficient lubrication between the cylinder wall and the piston.

5. In a pump, the combination with a base having an oil chamber in its bottom, of a cylinder mounted on the base and in open communication with the base, a reciprocating piston in the cylinder, and a member located between the cylinder and the base and acting to intercept oil splash from the oil chamber to the cylinder wall to prevent excessive lubrication between the cylinder wall and piston and receiving and holding oil on its upper surface to provide a limited but efficient lubrication between the cylinder and the piston.

6. In a pump, the combination with a base having an oil chamber in its bottom, of a cylinder mounted thereon and in open communication therewith, a piston in the cylinder, and a yielding member located between the base and the cylinder and intercepting the communication between the base and cylinder against oil splash from the oil chamber to prevent excessive lubrication between the cylinder and piston and adapted to hold oil on its upper surface to provide a limited but efficient lubrication for the piston and cylinder wall.

7. In a pump, the combination with a base, of a cylinder mounted thereon, an oiling member extending inward from the bottom of the cylinder wall, and means for supplying a limited quantity of oil to the top of the member to be transferred outward on its top by capillary action to the cylinder wall.

8. In a pump, the combination with a base having an oil chamber located therein, of a cylinder arranged on the base, a piston reciprocating within the cylinder, a baffle located at the bottom of the cylinder, and an absorbent member disposed above the baffle.

9. In a pump, the combination with a base having an oil chamber located therein, of a cylinder detachably arranged above the base, a piston reciprocating within the cylinder, a baffle located at the bottom of the cylinder, an absorbent member disposed above the baffle in juxtaposition thereto, and deflecting means on the lower face of the piston.

10. In a tire pump, a crank case having an opening in its circumferential wall and an inwardly projecting flange defining said opening and constituting a baffle ring and cylinder seat, a cylinder mounted thereon, a piston movable in said cylinder, and an annular lubricating pad supported upon said flange adapted to be engaged by the piston, upon the suction stroke of the latter, the pad being exposed to the opening, whereby it will be moistened with the lubricant by the splash from the crank case.

11. In a tire pump of the character described, a crank case, a cylinder mounted thereon, a piston operating in the cylinder, a shaft passing through the crank case, means operatively connecting the shaft to the piston to reciprocate the latter, a baffle flange formed at the junction of the crank case and the cylinder, a lubricating pad supported upon the flange and adapted to be compressed by the piston upon its suction stroke, and means whereby lubricant may be disposed in the lower portion of the crank case, there being an open space between the crank case and the adjoining portion of the cylinder and the pad being exposed to such space, as and for the purpose set forth.

12. In a pump, a crank case, a cylinder detachably mounted upon the crank case, a shaft passing through the crank case, a piston having a depending member longitudinally slotted to embrace the shaft, the slot opening at the lower end of the member, whereby said depending member may be dropped into position over the shaft when the cylinder is removed, and an actuating member mounted on the shaft and disposed at the side of said member and operatively connected with the piston.

13. In a pump, the combination with a base having an oil chamber located therein, of a cylinder arranged above the base, a piston reciprocating within the cylinder, a baffle located at the bottom of the cylinder, an absorbent member disposed above the baffle in juxtaposition thereto, and deflecting means on the lower face of the piston.

14. In a pump, the combination with a crank case and cylinder, of a shaft passing through the crank case, a piston having a guiding member provided with an open ended slot for removably engaging said shaft and an actuating member mounted on the shaft and pivotally connected with the piston.

15. In a pump, the combination with a cylinder and reciprocating piston, of a drive shaft, a pair of eccentrics mounted on the drive shaft in spaced relation to each other and pivotally connected with said piston, and a guiding member carried by said piston, the guiding member being located between said eccentrics and having an open ended slot removably engaging the drive shaft.

16. In a pump, the combination with a crank case of a cylinder, a piston in the cylinder, and an oil-receiving pad at the bottom of the cylinder for lubricating between the cylinder and the piston.

17. In a pump, the combination with a crank case, of a cylinder, a reciprocating piston in the cylinder, and a yielding oil receiving member at the bottom of the cylinder for lubricating between the piston and the cylinder.

18. In a pump, the combination with a crank case, of a cylinder, a reciprocating piston in the cylinder, a yielding oil receiving pad at the lower end of the cylinder, and means for supplying oil to the pad for lubricating between the piston and the cylinder.

19. In a pump, the combination with a crank case, a cylinder in communication with the case, and an oil-receiving and oil retaining pad projecting into the cylinder in the path of the lowest travel of the piston for lubricating between the piston and cylinder.

In testimony whereof, I hereunto affix my signature in the presence of two witnesses.

GEORGE W. KELLOGG.

Witnesses:
DANIEL L. THARP,
OLIVE M. DENGLER.